Oct. 30, 1934. R. W. SHANNON 1,978,650
STAND
Filed May 8, 1933 2 Sheets-Sheet 1
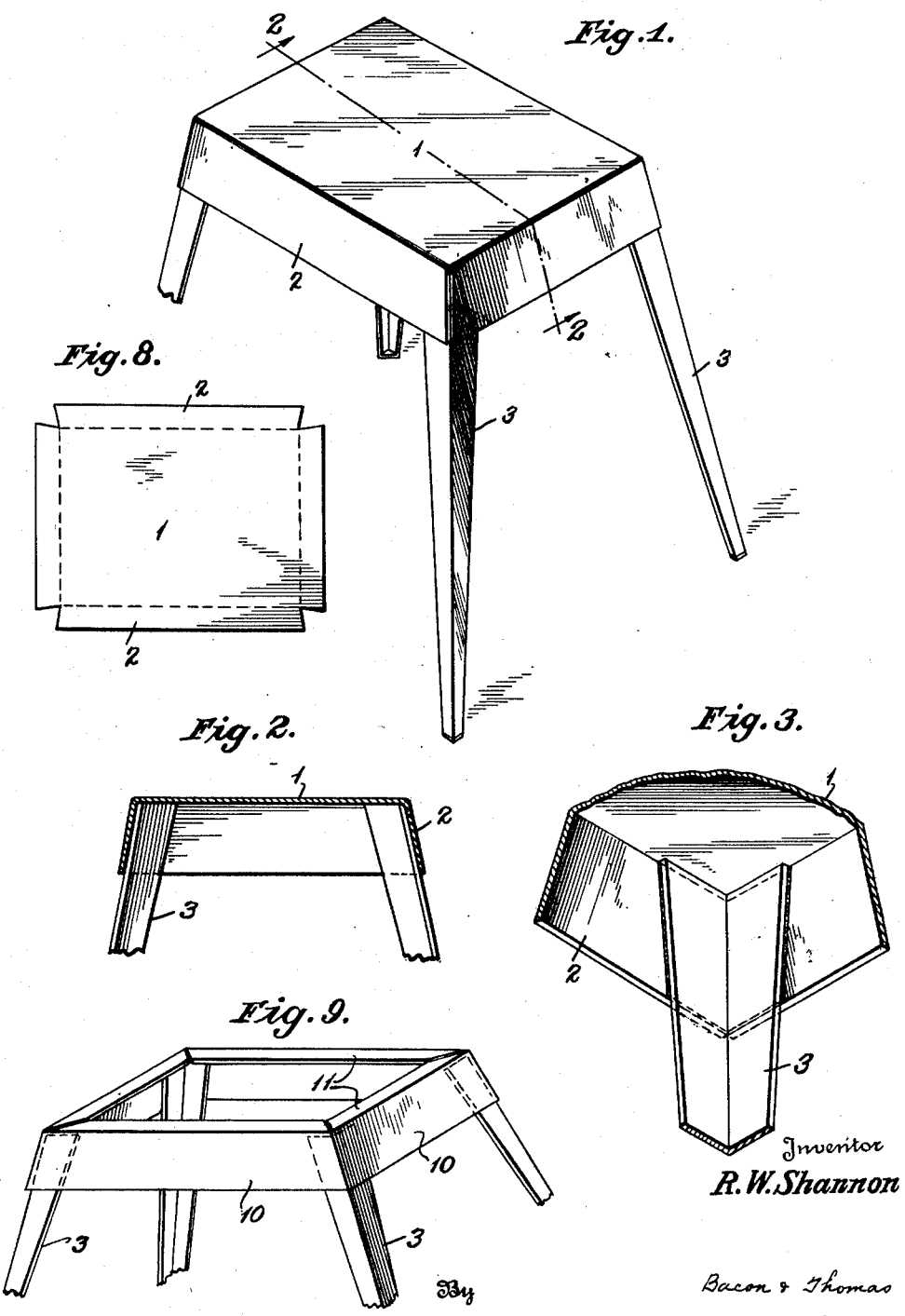

Oct. 30, 1934.  R. W. SHANNON  1,978,650
STAND
Filed May 8, 1933   2 Sheets-Sheet 2

Inventor
*R. W. Shannon*

By

*Bacon & Thomas*
Attorneys

Patented Oct. 30, 1934

1,978,650

UNITED STATES PATENT OFFICE 1,978,650

STAND

Randolph W. Shannon, Los Angeles, Calif.

Application May 8, 1933, Serial No. 669,969

5 Claims. (Cl. 45—31)

This invention relates to improvements in stands, tables, and the like.

The principal objects of the invention are to provide a stand, or the like, preferably formed of metal, which is light of weight but which stands firmly and has great resistance to lateral swaying or wobbling, the legs of which will automatically conform to relatively great irregularities of a supporting surface.

Another object of the invention is to provide a stand with readily removable legs.

It is a further object to provide a stand which has no additional joining means, such as rivets, bolts, screws, and the like, but wherein the desired unions may be made by welding or by socket frictional engagement.

Another object is to provide a stand with the above characteristics which may be adapted for use as a pedestal on which an additional and separate top of any desired larger size may be secured.

A further object is to provide a stand which is light in weight, strong and durable, yet extremely economical to manufacture.

Referring to the accompanying drawings, wherein like numerals refer to like parts:

Figure 1 is a perspective view of my improved stand;

Figure 2 is a longitudinal cross section of Fig. 1;

Figure 3 is a fragmentary perspective of a corner of the improved stand showing the leg in welded engagement;

Figure 8 is a plan view of the top of the stand showing the cut-out portions for the flanges before the flanges are bent down, and Figure 9 is a perspective of a modified form of the improved stand wherein it functions as a pedestal to support a separate top.

The novel stand herein described is preferably formed of metal such as low carbon steel or iron, which possesses strength in thin section to resist ordinary stresses and is further characterized by lightness in weight, a degree of elasticity and flexibility without loss of strength in required directions, and ability to be welded in a strong and permanent union.

Referring more particularly to the drawings, numeral 1 represents a sheet of metal preferably as above described, the corners of which are stamped or otherwise cut out to provide skirts or flanges 2 which are folded downwardly with respect to the portion 1 to extend at an obtuse angle with respect to the plane of the portion 1. The ends of the flanges from which portions have been cut are then adapted to meet, thus forming a continuous depending skirt or flange around the portion 1 which comprises the top of the stand.

Figure 4:
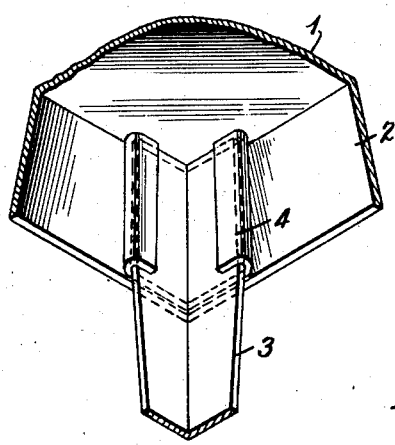
Figure 4 is a fragmentary perspective of a corner of a modified form of construction wherein the leg is engaged by a separate socket.
Figure 5:
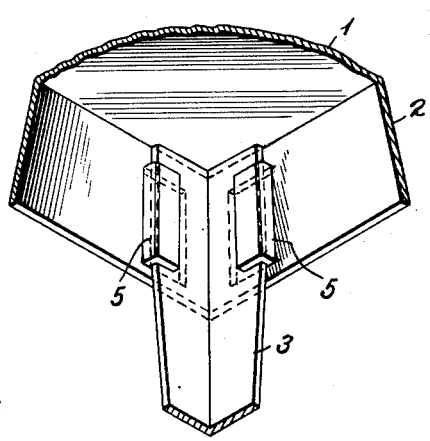
Figure 5 is a fragmentary perspective of another modified form of construction wherein the leg is engaged by portions of the stand top flange which are struck out to form a socket.

Into the corners of the flanges thus formed, legs 3 may be positioned and securely fastened therein by any suitable means, such as welding, as clearly shown in Fig. 3. If it is desired to provide a stand with detachable legs, the modified form of construction shown in Fig. 4 may be used, wherein a socket 4, formed preferably of the same metal and shaped to receive the upper portion of the leg 3 in wedge engagement, may be welded or otherwise firmly secured to the inner portion of the flanges. For the same purpose, it may be desirable to use the modified form of construction which is exemplified in Fig. 5, wherein portions 5 are struck out from the flanges themselves and bent over in the manner shown to provide a suitable socket into which the upper portion of a leg 3 is inserted. Legs 3 are preferably V-shaped in transverse cross-section with sides tapering towards the feet thereof. The detachable legs are slightly modified in that the ends of the legs joined to the stand top preferably have converging sides for wedge-like engagement with the socket and may be rounded or otherwise blunted to facilitate insertion into the sockets. The wedge engagement above described is not essential, however, and sockets whose sides are parallel instead of converging and corresponding leg ends whose sides are parallel instead of converging, may be satisfactorily used if desired.

It is readily seen that when legs 3 are welded directly to flanges 2, the flanges will then require no further joining means to prevent their spreading apart and the same is likewise true where a separate socket, such as indicated at 4, is welded or otherwise secured to adjacent ends of adjoining flanges.

An important feature of this invention comprises the position of the legs with respect to the stand top. As will be apparent from the drawings, the legs are disposed with their axes at an angle of greater than 90° with respect to the plane of the top of the stand. While this principle of placing the legs is not at all novel broadly, my utilization of this principle, combined with the particular parts employed and in the particular manner of assembly, is new and useful for the purposes outlined. The legs 3 extend outwardly at an obtuse angle with respect to the plane of the top which obtuse angle is the same as that formed by the flanges which depend from the top.

Another important feature of the invention comprises the absence of rigid bracing means from leg to leg below the flanges as is common in prior art structures. The absence of such bracing means permits the necessary movement of the legs and, in addition, incidentally greatly reduces the cost of manufacture.

I have found that the above described novel construction, in conjunction with the type of metal referred to herein, will provide the desired bracing effect and also will permit the necessary movement of the legs which movement is transmitted in great part to the flexible flanges and top and there distributed. Thus, each leg can be resting upon a different plane and yet the stand will not wobble and the top will remain substantially flat. For example, one leg may rest upon a surface several inches or more higher than the surface upon which the remaining legs rest and the stand will remain just as rigid as when all of the legs are resting upon a surface in one plane.

To refer more specifically to the type of material which I find it preferable to use, I have found that excellent results are obtained by using a sheet of low carbon steel 0.04 inch thick for the top 1 of the stand which, with the strengthening effect of the turned down flanges 2, provides sufficient rigidity together with the required degree of elasticity to make a very satisfactory article when assembled without additional bracing means. Additional bracing means on the underside of the top and flanges may, of course, be employed if found necessary, but must not make the top or flanges entirely rigid. For the legs 3, I have satisfactorily used low carbon steel .06 inch thick in a tapered angle shape. The socket 4, above referred to, is preferably of metal of the same thickness as the stand top, although variations in thickness may be used if desired.

Figure 6:
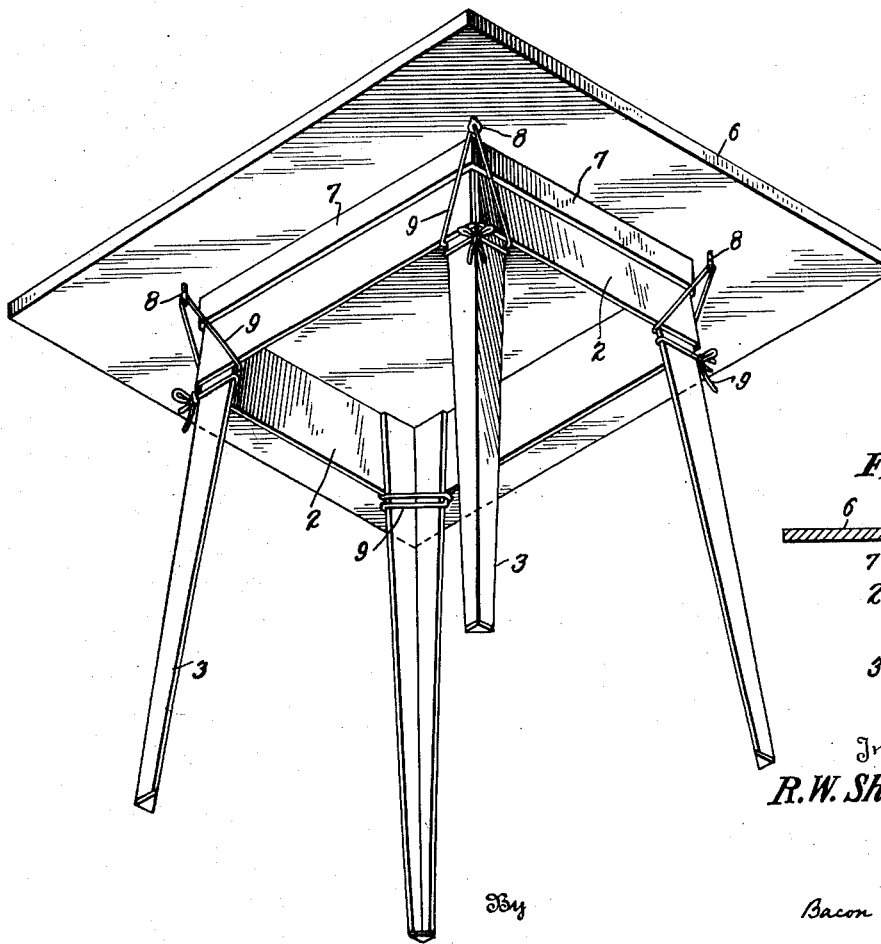
Figure 6 is a perspective of a modified adaptation of the improved stand wherein it functions as a pedestal to support a larger table top.
Figure 7:
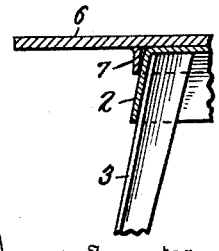
Figure 7 is a fragmentary detailed sectional view of Fig. 6.

In a modified form of construction, which is clearly shown in Figs. 6 and 7, my improved stand, in addition to its use per se, may be used as a pedestal upon which to support a separate top of any desired larger size. In this instance, I provide such a top 6 which has affixed to its undersurface, flanges 7 which form a socket slightly larger than the top 1 of the stand and into which the top of the stand may be inserted. These flanges need not be continuous, but may be short sections or buttons to hold the extra top against horizontal movement. Any suitable means for retaining the top 6 and the stand as a unit may be employed, such as the means shown in Fig. 6, wherein loops 8 are carried by the top 6 at point adjacent flanges 7 through which straps 9 may be passed and thence passed around legs 3 and tied. I have also used spring clips (not shown) one end of which is fixed to the extra top 6 and the other end hooked to the flange 2 of the stand, the spring permitting the leg movement to take place.

In other instances, where it is desired to use a pedestal which embodies the novel features of my invention for support of a separate top, the modification shown in Fig. 9 may be adopted wherein flanges 10 replace top 1 and flanges 2 of the preferred construction. The flanges 10 may be of separate pieces or may be formed from one piece of metal. These flanges may have portions 11 bent over to facilitate the support thereon of a separate top either of a size equivalent to that of the area defined by the uppermost horizontal sides of flanges or of a greater size than the top indicated by numeral 6 in Fig. 6. Legs 3 may be permanently attached to the flanges 10 by welding or the like, and they may be removably attached thereto by means of the socket engagement hereinbefore described. It is obvious that the modified assembly is applicable only where a separate top surface is to be used and the object thereof is to reduce the weight of the stand, as well as its cost of manufacture inasmuch as a minimum amount of metal is required.

The improved sand which I have herein described may be finished by painting, electro-plating, or the like, or no coating at all may be necessary after fabrication, particularly where rust-proof metals, such as stainless steel, is used. It is also obvious that either the top of the stand or the entire stand may be covered with any desirable non-metallic substance, such as cloth, felt, or the like, and that casters may be provided on the feet if so desired.

It is apparent that stands of this type are useful for a great many purposes, among which may be menioned use as a support for typewriters, wherein the vibration and jarring occasioned by the operation thereof set up objectionable and annoying swaying and wobbling in ordinary tables.

It is understood that various structural changes and modifications may be made without departing from the spirit of my invention.

Having thus described my invention, I claim:

1. A stand which comprises, in combination, a rectangular flexible top, integral flexible flanges depending from the top at an obtuse angle with respect to the plane of the top, and legs carried by said flanges, said flanges forming the sole connecting means between said legs, and said legs extending at substantially the same obtuse angle with respect to the plane of the top as the flanges whereby, when a weight is placed upon the stand top, the top and flanges will flex until the legs conform to irregularities in a supporting surface and automatically provide a four point support.

2. A stand which comprises, in combination, a rectangular flexible top, integral flexible flanges depending from the top at an obtuse angle with respect to the plane of the top, and legs detachably carried by said flanges, said flanges forming the sole connecting means between said legs, and said legs substantially extending at the same obtuse angle with respect to the plane of the top as the flanges whereby, when a weight is placed upon the stand top, the top and flanges will flex until the legs conform to irregularities in a supporting surface and automatically provide a four point support.

3. A stand which comprises, in combination, a rectangular flexible top, integral flexible flanges depending from the top at an obtuse angle with respect to the plane of the top, V-shaped legs connected to the flanges adjacent the inner surfaces and adjacent the ends of the flanges, said flanges forming the sole connecting means between said legs, and said legs extending from the top of the stand at substantially the same obtuse angle with respect to the plane of the top as the flanges, the connection between each leg and its adjacent flanges preventing said flanges from spreading, but permitting said top and flanges to flex when a weight is placed upon the top and thereby cause the legs to conform to irregularities in a supporting surface.

4. A stand which comprises, in combination, a flexible top, flexible flanges depending from the top at an obtuse angle with respect to the plane of the top, and legs carried by said flanges, said flanges forming the sole connecting means between said legs whereby, when a weight is placed upon the stand top, the top and flanges will flex until the legs conform to irregularities in a supporting surface.

5. A stand which comprises in combination, outspread supporting legs and flexible means connecting said legs at the upper ends thereof, said flexible means constituting the sole connection between the legs whereby, when a weight is placed on the stand, said means will flex until the legs conform to irregularities in a supporting surface.

RANDOLPH W. SHANNON.